Jan. 23, 1923. 1,442,893.
G. Q. LEWIS.
FRICTION SHOCK ABSORBING MECHANISM.
FILED JULY 12, 1920.
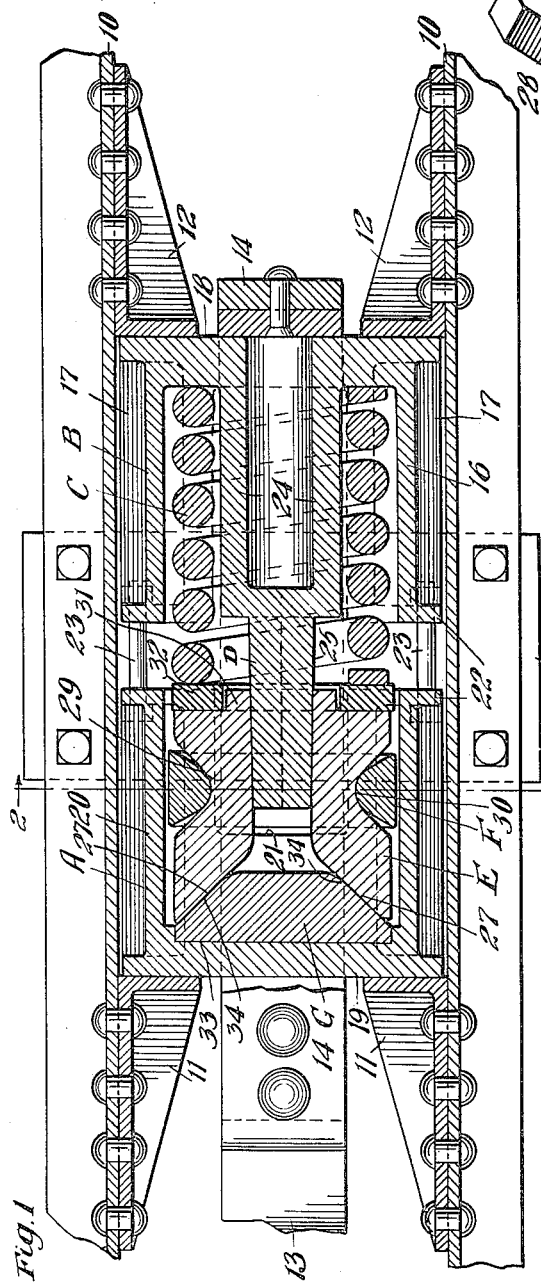
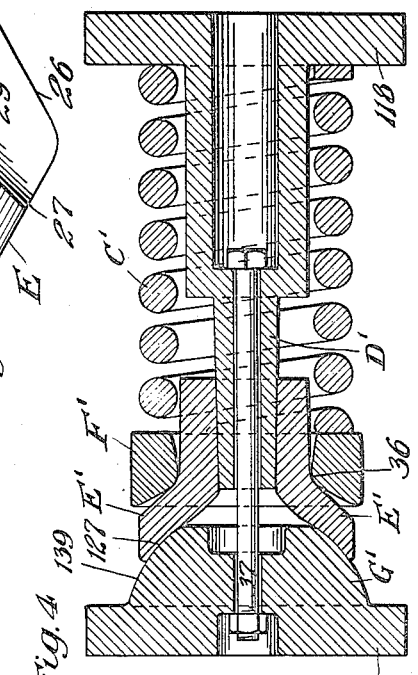
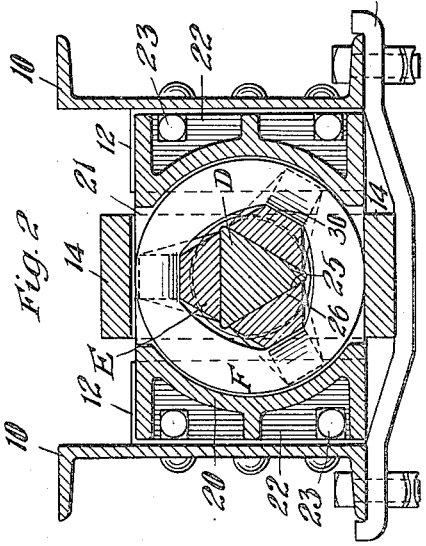
Witnesses
Wm. Geiger
Inventor
Goodrich Q Lewis
By Geo. I. Haight
His Atty.

Patented Jan. 23, 1923.

1,442,893

UNITED STATES PATENT OFFICE.

GOODRICH Q. LEWIS, OF WHEATON, ILLINOIS, ASSIGNOR TO WILLIAM H. MINER, OF CHAZY, NEW YORK.

FRICTION SHOCK-ABSORBING MECHANISM.

Application filed July 12, 1920. Serial No. 395,482.

*To all whom it may concern:*

Be it known that I, GOODRICH Q. LEWIS, a citizen of the United States, residing at Wheaton, in the county of Du Page and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism especially adapted for railway draft riggings and wherein is obtained high capacity, certain release, and efficient operation.

A more specific object of the invention is to provide a friction shock absorbing mechanism of the character indicated wherein are employed a plurality of fulcrumed friction shoes.

In the drawing forming a part of this specification, Figure 1 is a horizontal longitudinal sectional view of a portion of a railway draft rigging showing my improvements in connection therewith. The portion of the sectional view through the shoes C is in two intersecting planes extending at an angle of 120° to each other in order to better illustrate the actual construction. Figure 2 is a vertical transverse sectional view taken substantially on the line 2—2 of Figure 1. Figure 3 is a detail perspective of one of the friction shoes. And Figure 4 is a view corresponding to Figure 1 illustrating a somewhat different embodiment of the invention.

Referring to the construction illustrated in Figures 1, 2 and 3 of the drawing, 10—10 denote channel shaped center sills of a railway car to the inner faces of which are secured front stop lugs 11 and rear stop lugs 12. A portion of a drawbar is indicated at 13 to which is attached a yoke 14 of well known form. The shock absorbing mechanism proper, hereinafter described, is mounted within the yoke 14 and the latter, together with the mechanism, is supported in operative position by a detachable saddle plate 15.

The improved shock absorbing mechanism, as shown, comprises, broadly, a front cage A; a rear cage B; a spring C; a friction post D; a plurality of friction shoes E—E; a fulcrum ring F; and a wedge G.

The rear cage B is formed with rounded side walls 16—16 and open at its top and bottom, the side walls being suitably braced by ribs 17—17. Said cage B has an integral rear wall 18 adapted to act as the rear follower of the mechanism. The front cage A is of generally similar form having a front wall 19 and rounded side walls 20—20, the top and bottom being open as indicated at 21 in Figure 2. The two cages A and B are provided at their inner opposed ends with transversely extending flanges 22, the same being normally separated a distance corresponding to the permissible movement of the mechanism. To hold the parts in assembled relation during shipment and also to maintain the spring under an initial compression if desired, a plurality of connecting bolts 23—23 may be employed extending between the flanges 22—22.

The cage B has formed integrally therewith a hollow central post 24 which extends forwardly, the hollow post 24 being preferably of circular form and acting as a centering device for the spring C. The friction post proper, D, is formed integrally with the post 24 and extends forwardly of the latter. The friction post proper D is preferably of triangular cross section as indicated in Figure 2, thus providing three longitudinally extending friction surfaces 25—25 symmetrically arranged with respect to the axis of the post. Said surfaces 25 may be made slightly rearwardly diverging as shown in Figure 1.

The friction shoes E are three in number to correspond with the three friction surfaces 25. Each shoe E is formed on its inner side with a longitudinally extending generally flat friction surface 26 and at its outer end with an inclined wedging face 27. On its exterior, each shoe E is formed with a recess 28 having a rounded bottom bearing 29. The fulcrum ring F encircles the three shoes E and, at equi-distantly spaced points, has the section thereof formed with a rounded inner edge as indicated at 30 and on which the shoes E are pivoted or fulcrumed, as clearly indicated in Figure 1. It will be noted that the recesses 28 in the shoes are made sufficiently flaring as to permit pivotal or rocking movement of the shoes with respect to the ring F.

Each of the shoes E is notched or rabbeted at its inner end as indicated at 31 so as to form seats for a spring washer 32 and thereby provide a uniform bearing for each of the shoes on the spring C.

The wedge G preferably consists of a single block seated in a socket 33 formed on the interior of the cage A. Said wedge G is provided with three wedging faces 34—34 cooperable with the wedge faces 27 of the shoes E.

The operation is as follows: Assuming an inward or buffing movement of the drawbar, the cage A will be forced rearwardly toward the cage B. Obviously the wedge G will move with the cage A and tend to separate or swing the outer ends of the shoes E about the fulcrums provided therefor by the ring F. The inner ends of the shoes are thereby swung or pressed inwardly into tight frictional engagement with the surfaces of the post D. The shoes E will move rearwardly along with the cage A, resistance being afforded by the spring C. This action continues until the two cages A and B come into engagement, the latter then acting as a continuous column to resist excessive shocks and prevent over-compression or setting of the spring. The release is effected by the spring C acting through the shoes E.

It will be noted that I preferably employ a triangular section in the post D with corresponding arrangement of the shoes E as this is the most efficient manner of insuring an equalized pressure and action on all sets of friction surfaces and furthermore insures the uniform distribution of the tension forces set up in the ring F.

In the construction illustrated in Figure 4, the post D' is formed integrally with the rear follower 118 with the cage proper omitted. The wedge G' is made integral with a front follower 35 and a corresponding omission of any true front cage. The shoes E'—E' in this construction are preferably formed with concaved wedge-arranged surfaces 127 and the corresponding cooperating surfaces 139 of the wedge G' made convex. A fulcruming ring F' is provided, the pivotal mounting of the shoes D' thereon occurring at the points indicated at 36—36. In this construction, the spring C' is made to react against the ring F' instead of directly against the shoes. To hold the parts in assembled relation, a retainer bolt 37 is employed which extends through the post D' and through the wedge G'. The action is substantially the same as with the construction illustrated in Figure 1.

I have herein shown and described what I now consider the preferred manner of carrying out the invention but the same is merely by way of illustration and not by way of limitation. All changes and modifications are contemplated that come within the scope of the claims appended hereto.

I claim:

1. In a friction shock absorbing mechanism, the combination with a friction member having longitudinally extending friction surfaces; of a plurality of shoes frictionally cooperable with said member; a spring; means forming a fulcrum for said shoes on the sides opposite the friction surfaces thereof which engage said first named friction member; and a member having wedge faces cooperable with said shoes, said wedge member, shoes and fulcrum means being all relatively longitudinally movable with respect to the first named friction member.

2. In a friction shock absorbing mechanism, the combination with a friction post; of a plurality of friction shoes cooperable with the exterior surfaces of said post; a spring; means providing a fulcrum for said shoes on the outer sides of the latter; and wedge-acting means cooperable with said shoes.

3. In a friction shock absorbing mechanism, the combination with a friction member having three lngitudinally extending friction surfaces symmetrically arranged with respect to the axis of said member; of three friction shoes cooperable with said member; a spring; means providing a fulcrum for said shoes on the sides opposite the friction surfaces thereof, which engage said first named friction member; and wedge acting means engaging with the ends of said shoes, tending to oscillate the latter about said fulcrum means and adapted to transmit the full pressure of the load when the mechanism is actuated.

4. In a friction shock absorbing mechanism, the combination with a friction post of equilateral triangular cross section and providing three longitudinally extending friction surfaces symmetrically arranged with respect to the axis of the post; three friction shoes disposed around the post and frictionally cooperable therewith; a spring resistance; means providing a fulcrum for said shoes on the outer sides thereof; and wedge-acting means cooperable with said shoes.

5. In a friction shock absorbing mechanism, the combination with a friction post having longitudinally extending friction surfaces; of a plurality of friction shoes arranged around and cooperable with said post; a spring resistance; a ring encircling said shoes and on which the latter are fulcrumed; and wedge-acting means cooperable with one set of ends of the shoes.

6. In a friction shock absorbing mechanism, the combination with a friction post having exterior friction surfaces diverging from the outer end of the post toward the opposite end thereof; a plurality of friction shoes arranged around the post and frictionally cooperable therewith; a spring resistance; means providing a fulcrum for said shoes on the outer sides of the latter; and wedge-acting means cooperable with one set of ends of the shoes.

7. In a friction shock absorbing mechanism, the combination with a friction post having exterior friction surfaces diverging from the outer end of the post toward the opposite end thereof; a plurality of friction shoes arranged around the post and frictionally cooperable therewith; a spring resistance; means providing a fulcrum for said shoes on the outer sides of the latter; and wedge-acting means cooperable with one set of ends of the shoes, the other ends of the shoes directly engaging the spring resistance.

8. In a friction shock absorbing mechanism, the combination with a friction post of equilateral triangular cross section providing three longitudinally extending friction surfaces symmetrically arranged with respect to the axis of the post; of three shoes cooperable with the surfaces of said post, each shoe having an inner friction surface and a wedge face at one end thereof; a spring resistance; a ring encircling the shoes and upon which the latter are fulcrumed intermediate their ends; and a wedge cooperable with said wedge ends of the shoes.

9. In a friction shock absorbing mechanism of the character described, the combination with two cages normally separated and relatively longitudinally movable, one of said cages having a centrally disposed friction post rigid with respect thereto and extending toward the other cage; of a wedge movable in unison with said other cage; a plurality of friction shoes arranged around the post and frictionally cooperable therewith, the ends of said shoes having wedging engagement with said wedge; a spring encircling said post and cooperable with the shoes; and a ring encircling the shoes, each shoe having pivotal engagement with the inner edge of the ring.

In witness that I claim the foregoing I have hereunto subscribed my name this 21st day of June, 1920.

GOODRICH Q. LEWIS.

Witnesses:
 CARRIE GAILING,
 UNA C. GRIGSBY.